(12) United States Patent
Schubert et al.

(10) Patent No.: US 9,990,060 B1
(45) Date of Patent: *Jun. 5, 2018

(54) FILTERING STYLUS STROKES

(71) Applicant: Amazon Technologies, Inc., Seattle, WA (US)

(72) Inventors: Heidi Christine Schubert, Palo Alto, CA (US); Lutz Gerhard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/895,660

(22) Filed: Feb. 13, 2018

Related U.S. Application Data

(62) Division of application No. 14/570,727, filed on Dec. 15, 2014, now Pat. No. 9,898,099.

(51) Int. Cl.
G06F 3/041 (2006.01)
G06F 3/0354 (2013.01)

(52) U.S. Cl.
CPC .......... *G06F 3/03545* (2013.01); *G06F 3/041* (2013.01)

(58) Field of Classification Search
None
See application file for complete search history.

(56) References Cited

U.S. PATENT DOCUMENTS

| | | | | |
|---|---|---|---|---|
| 5,825,351 A * | 10/1998 | Tam | ......................... | G06F 3/044 345/157 |
| 5,837,947 A * | 11/1998 | Teterwak | ................ | G06F 3/044 178/18.01 |
| 6,366,866 B1 * | 4/2002 | Kanagawa | ............ | G06F 3/0418 178/18.02 |
| 7,184,898 B2 * | 2/2007 | Sullivan | ................ | G06F 3/0418 702/150 |
| 2002/0145596 A1 * | 10/2002 | Vardi | ..................... | G06K 9/222 345/179 |
| 2005/0281467 A1 * | 12/2005 | Stahovich | .......... | G06K 9/00416 382/202 |
| 2013/0002600 A1 * | 1/2013 | McCracken | ............ | G06F 3/044 345/174 |
| 2014/0236529 A1 * | 8/2014 | Gyorfi | ..................... | G06F 3/017 702/141 |
| 2015/0062021 A1 * | 3/2015 | Skaljak | ............... | G06F 3/04883 345/173 |

\* cited by examiner

*Primary Examiner* — Premal Patel
*Assistant Examiner* — Sarvesh J Nadkarni
(74) *Attorney, Agent, or Firm* — Pierce Atwood LLP

(57) ABSTRACT

Devices, systems and methods are disclosed for processing stylus interactions with a device and drawing the results of those interactions in a manner that reduces noise and latency. This includes selecting a filter based on a velocity of an input, the velocity determined by comparing coordinates and timestamps associated with the input events. A first filter may be determined using previous input events to reduce latency and a second filter may be determined using previous and subsequent input events to improve accuracy of the filter selection. An output may be generated using the first filter and/or the second filter to combine the benefits of the reduced latency and the increased accuracy.

20 Claims, 13 Drawing Sheets

Unfiltered Writing 202

Filtered Writing 204

Unfiltered Writing 202

Filtered Writing 206

FIG. 4A
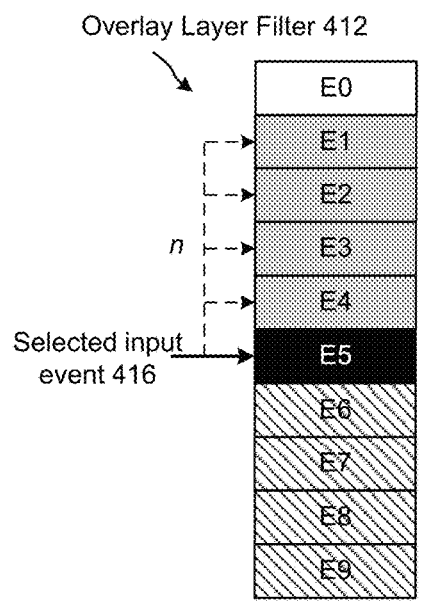
Overlay Layer Filter 412
Selected input event 416
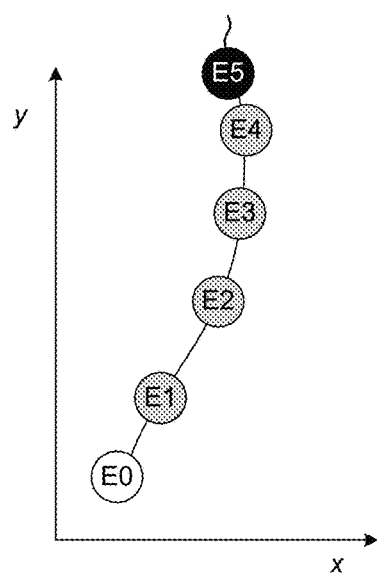
Selected input event 416
FIG. 4B
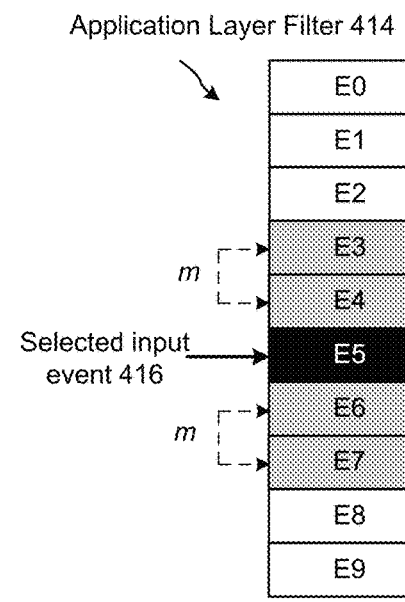
Application Layer Filter 414
Selected input event 416
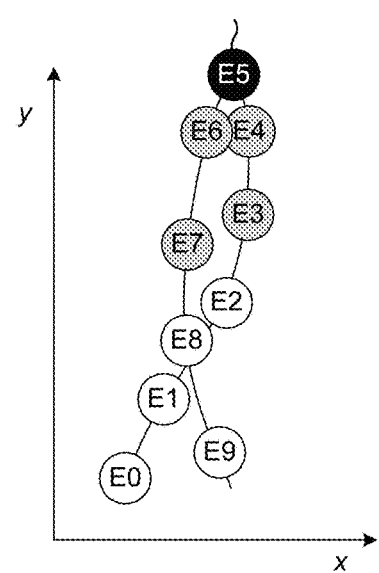
Selected input event 416

FILTERING STYLUS STROKES

CROSS-REFERENCE TO RELATED APPLICATION DATA

This application is a divisional of, and claims the benefit of priority of, U.S. Non-provisional patent application Ser. No. 14/570,727, filed Dec. 15, 2014 and entitled FILTERING STYLUS STROKES," in the names of Heidi Christine Schubert, et al., which is herein incorporated by reference in its entirety.

BACKGROUND

With the advancement of technology, the use and popularity of electronic devices, such as mobile devices, has increased considerably. Mobile devices, such as smart phones and tablet computers, typically have touchscreens that enable a user to operate the devices by touching the screen with a finger or stylus type device.

BRIEF DESCRIPTION OF DRAWINGS

For a more complete understanding of the present disclosure, reference is now made to the following description taken in conjunction with the accompanying drawings.

FIG. 4A-4B illustrate examples of input events used in an overlay layer filter and in an application layer filter according to embodiments of the present disclosure.

DETAILED DESCRIPTION

Figure 1:
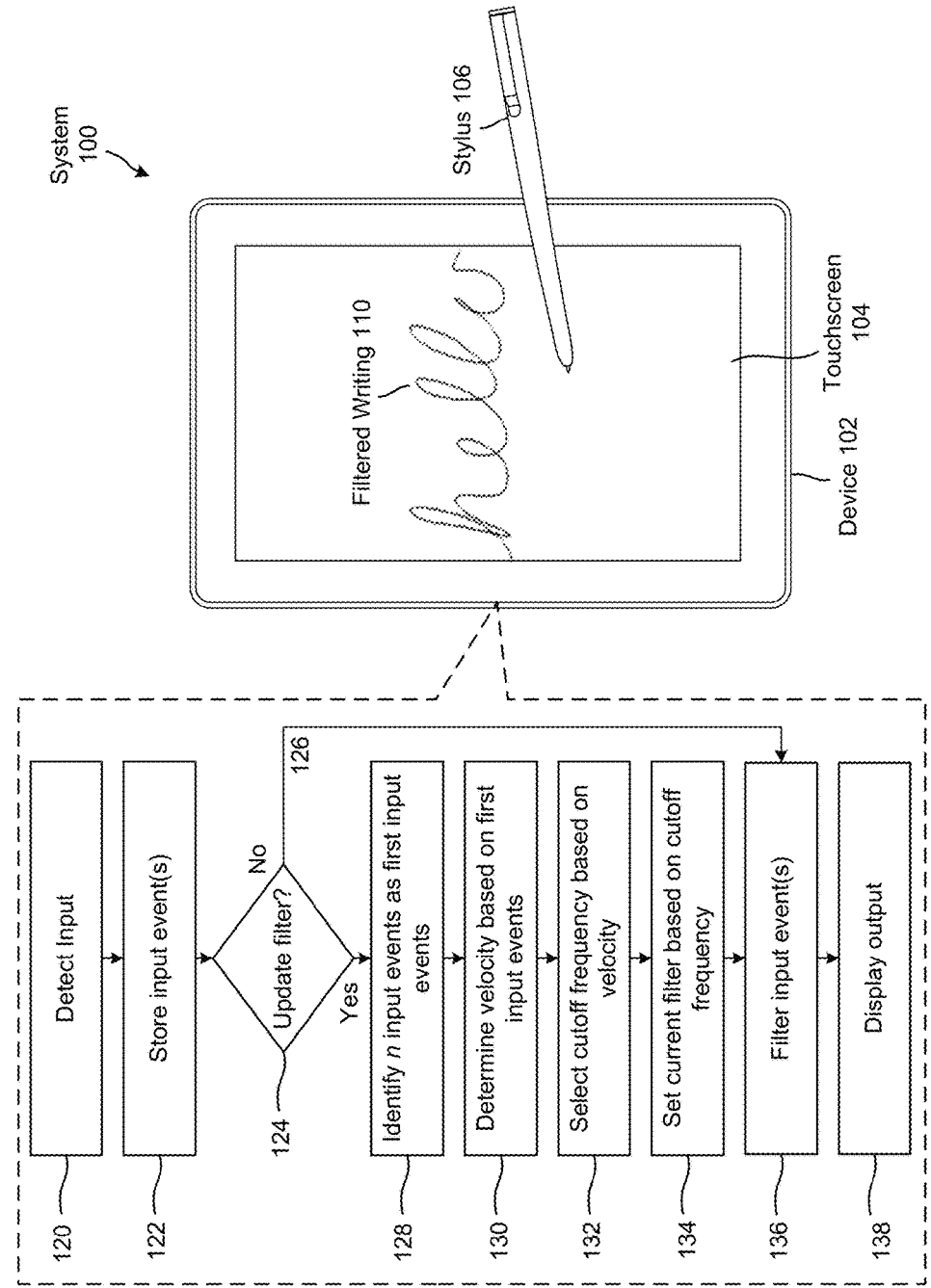
FIG. 1 illustrates an overview of a system for implementing embodiments of the present disclosure.

A stylus is typically used to write, draw and otherwise interact with a touch screen or other surface of a computing device to provide input to the computing device, such as to the programs and/or operating system running on the computing device (referred to here as "applications"). Stylus strokes are processed by the computing device and the applications, as well as the screen of the computing device. The applications and screen are then updated accordingly. Stylus strokes (also called stroke data, stylus inputs or input events, which are sample points that make up a stylus stroke) may exhibit inconsistent results due to noise and a non-linearity in the touch sensor, such as a straight line input by the stylus being rendered with jitter such as jagged or wavy patterns. For example, the jitter may result from minor variation between where a stylus has actually touched the screen and where the stylus is detected touching the screen. Thus, the stylus stroke may have low frequency components, which are associated with input from the user, and high frequency components, which may be undesired variations in the stylus stroke caused by the wave pattern. An amplitude and/or frequency of the wave pattern may be based on a speed of writing, such that a faster stroke may increase the frequency and a slower stroke may decrease the frequency of the wave pattern. In addition, the wave pattern may vary based on a location on the device, as the wave pattern may exhibit a larger amplitude and/or higher frequency in some areas of the touch screen.

The input events may be received as a time series of data in two dimensions: x(t) and y(t). Typically, the wave pattern visible in the two dimensions may be reduced by filtering the input events to generate a smooth output without the jitter. For example, as the wave pattern is associated with the high frequency components of the stylus strokes, the device may apply a low-pass filter to x(t) and to y(t) to attenuate noise above a cutoff frequency in the x dimension and/or the y dimension. If the cutoff frequency is set to be lower than the frequency of the undesired wave pattern, then the wave pattern will be reduced. However, filtering has a strong trade-off between latency and cutoff frequency. To increase a smoothness of the output by decreasing the cutoff frequency, the filter must average over more input events, resulting in output events lagging behind the input events. This may result in a delay from when a stylus input occurs and the time when the effect of the input appears on the screen. For example, in the case of a drawing program, the user may be drawing with the stylus but there may be a noticeable delay between when the stylus moves across the screen and the corresponding pen strokes are rendered and displayed where the stylus contacted this screen. This delay can be described as a lag, both in time (for example, an amount of time it takes the rendering and display of what is being drawn to catch up with the actual movement of the stylus) and in space (for example, how far away the displayed ink is from the actual location or position of the stylus). This lag may translate into a poor, and undesired, user experience.

Figure 2A:
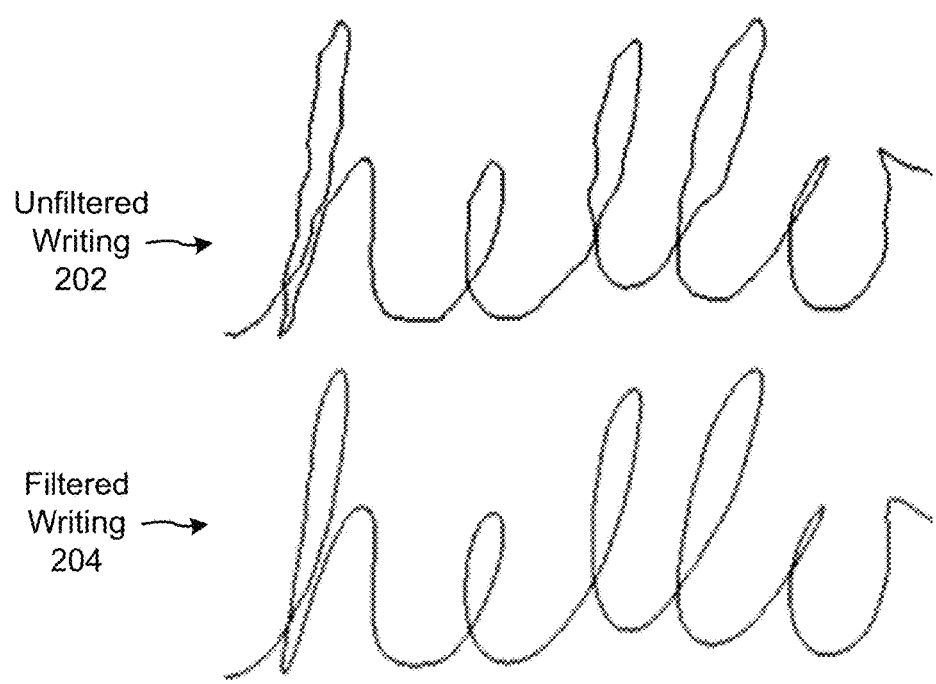
FIGS. 2A-2C illustrate examples of unfiltered and filtered writing.
Figure 2B:
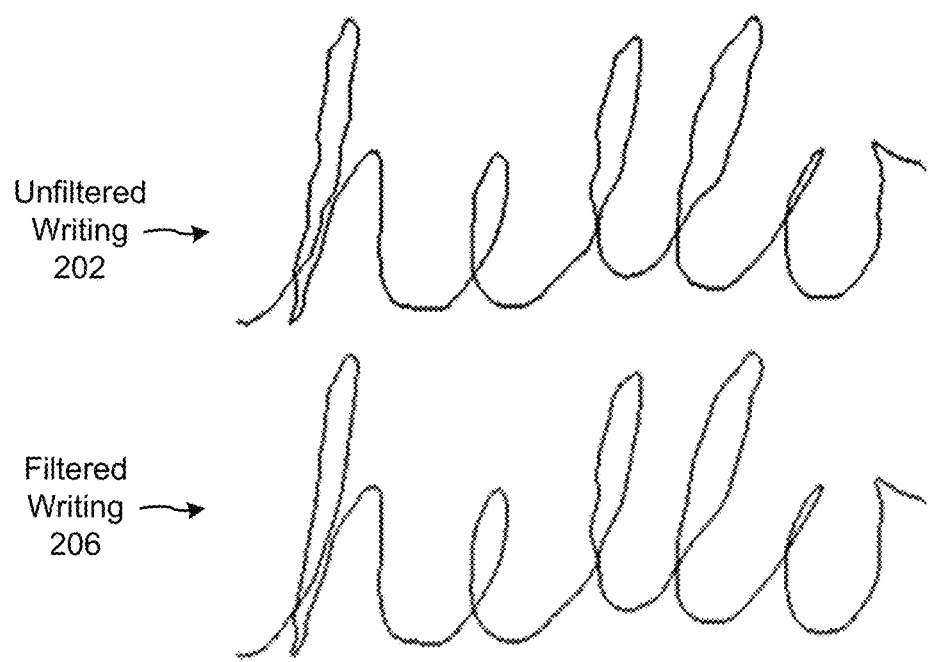
Figure 2C:
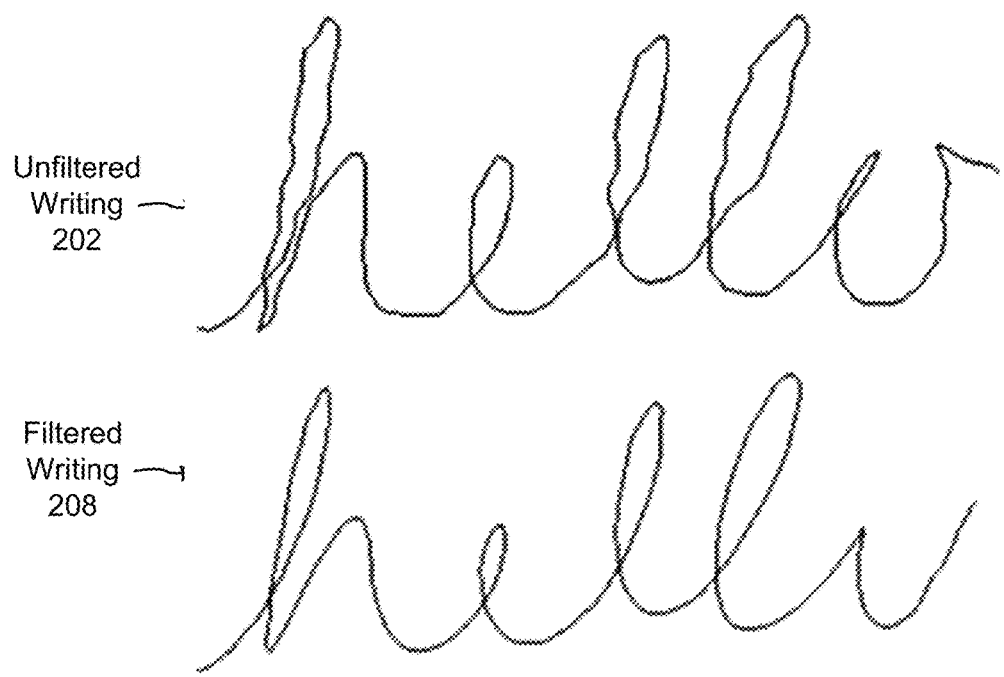

In addition, as the time-based frequency of the wave pattern is based on a speed of writing, the filtering must be tuned to the writing speed. FIG. 2A illustrates an example of unfiltered writing 202 and filtered writing 204 using a cutoff frequency tuned to a medium writing speed. The filtered writing 204 appears to properly filter and smooth the stylus stroke. However, FIG. 2B illustrates an example of the unfiltered writing 202 and filtered writing 206 using the cutoff frequency tuned to the medium writing speed when the input events have a slow writing speed. As the writing speed is slow, a corresponding frequency of the wave pattern is lower than the cutoff frequency, resulting in insufficient smoothing of the stylus stroke as the filter does not remove the undesired wave pattern. In contrast, FIG. 2C illustrates an example of the unfiltered writing 202 and filtered writing 208 using the cutoff frequency tuned to the medium writing speed when the input events have a fast writing speed. As the writing speed is fast, a corresponding frequency of the wave pattern is higher than the cutoff frequency, resulting in over-smoothing that removes/smooths out desired characteristics of the stylus stroke as the filter removes the undesired wave pattern and also removes desired motion.

To address these issues, devices, systems and methods are disclosed that determine a cutoff frequency of a filter based on a writing speed and may reduce the lag, both in time and space, by combining a lower latency filter and a higher latency filter with enhanced smoothness. One embodiment for improving the rendering of stylus strokes involves determining a velocity of the writing based on timestamps associated with a batch of input events, selecting a cutoff frequency of a filter based on the velocity, and filtering the batch of input events using the filter. For example, the device may receive a series of input events and may identify a first batch of input events and a second batch of input events. The device may determine a first velocity of the writing during the first batch, select a cutoff frequency of a first filter based on the first velocity and filter the first batch with the first filter. Similarly, the device may determine a second velocity of the writing during the second batch, select a cutoff frequency of a second filter based on the second velocity and filter the second batch with the second filter. Thus, different regions of the same series of input events may be filtered based on different respective velocities, resulting in a smoother rendering of the input. Another embodiment for improving the rendering of stylus strokes involves displaying a first output generated using fewer input events during stylus strokes for reduced lag and displaying a second output generated using more input events and/or a lower cutoff frequencies for enhanced smoothness upon completion of the stylus stroke. Another embodiment for improving the rendering of stylus strokes involves generating a first output using available input events and generating a second output using additional input events and/or a lower cutoff frequencies, the rendering displaying the first output initially and replacing portions of the first output with portions of the second output as the portions of the second output become available.

FIG. 1 illustrates an overview of a system 100 for implementing embodiments of the disclosure. The system includes a computing device 102 having a display touchscreen 104, and a stylus 106 that interacts with the touchscreen 104 to write, draw, or otherwise interact with the touchscreen 104, and through the touchscreen 104, one or more applications and/or processes of the computing device 102. The touchscreen 104 is a display capable of receiving input via contact between an object (such as a finger, stylus, etc.) and the screen. For example, a user may interact with a drawing application running on the computing device 102 using the stylus 106. As shown in FIG. 1, a stylus 106 is being used to operate the computing device 102 through the touchscreen 104 and the display 104 includes filtered writing 110 created with the stylus 106.

A stylus stroke may exhibit inconsistent results due to noise and a non-linearity in the touch sensor, such as a straight line input by the stylus being rendered with jitter such as jagged or wavy patterns. For example, the jitter may result from minor variation between where a stylus has actually touched the screen and where the stylus is detected touching the screen. An amplitude and/or frequency of the wave pattern may be based on a speed of writing, so the device 102 may attempt to filter the input events of the stylus stroke to remove the undesired wave pattern while not removing desired characteristics of the stylus stroke. The noise and wave pattern created by the non-linearity in the touch sensor may be caused by movement in a first direction, while the wave pattern may be exhibited in the first direction and/or a second direction. For example, a vertical line in the y-direction may exhibit a wave pattern in the x-direction, whereas a horizontal line in the x-direction may not exhibit the wave pattern. Therefore, the device 102 may set a cutoff frequency of a filter using coordinates in the first direction and may filter input events in both the first direction and the second direction using the filter.

To generate the filtered writing 110, the device 102 may detect (120) an input on the display 104 and may store (122) input event(s) associated with the input. For example, the stylus 106 may contact the display 104 and draw a letter or a word on the display 106, and the device 102 may generate and store input event(s) associated with the letter or word.

The device 102 may determine (124) if a filter should be updated. The device 102 may refresh the filter based on time (e.g., a refresh rate of 20 Hz), input events (e.g., once every 20 input events), distance (e.g., once a distance between a first input event and a subsequent input event exceeds a threshold) and/or velocity (e.g., a change in velocity exceeding a threshold). Thus, while the device 102 may monitor input events, the device 102 may refresh the filter at desired intervals (in time, input events or distance) and/or based on a change in velocity. If the device 102 determines that the filter should not be updated, the device 102 may loop (126) to step 136 described below and filter the input event(s) using a current filter. If the device 102 determines that the filter should be updated, the device 102 may proceed to step 128 to update the current filter.

The device 102 may identify (128) n input events as first input events, where n is a natural number. For example, the device 102 may identify 5 input events, such as the most recent 5 input events, as first input events. As another example, the device 102 may identify 5 input events centered on a particular input event as the first input events. The device 102 may determine (130) a velocity of the stylus contact in a first direction (e.g., y direction) based on the first input events by comparing coordinates and timestamps associated with the first input events. For example, the device 102 may calculate a position difference between coordinates of a first input event and a second input event in the first direction and a time difference between timestamps of the first input event and the second input event and determine a velocity in the first direction based on the position difference between the coordinates and the time difference between timestamps. However, embodiments may vary and the disclosure is not limited thereto.

The device 102 may select (132) a cutoff frequency based on the velocity of the stylus contact and may set (134) the current filter based on the cutoff frequency. For example, the device 102 may calculate a cutoff frequency or may use a lookup table to determine a cutoff frequency, using the velocity determined in step 130, and set the current filter based on the determined cutoff frequency. If the velocity and corresponding cutoff frequency changes significantly in a short period of time, the device 102 may update the filter in a series of intervals to gradually transition from the first cutoff frequency to the second cutoff frequency without affecting the output. For example, if the cutoff frequency changes abruptly from 6 Hz to 18 Hz, the device 102 may transition from a cutoff frequency of 6 Hz to 10 Hz to 14 Hz to 18 Hz over a period of time instead of changing the cutoff frequency directly from 6 Hz to 18 Hz.

The device may filter (136) select input events using the current filter. For example, the device may refresh the current filter periodically as discussed with regard to step 124 and the select input events may be input events associated with a respective filter.

The device 102 may display (138) the screen output. For example, the device 102 may add the most recently filtered input events to the existing screen output so that a stylus stroke continues to be displayed as the stylus 106 travels across the display 104. As input events occur and are filtered by the device 102, the filtered input events may be added to the screen output with a slight delay between detecting the input events and rendering the input events on the display 104. Therefore, as additional input events are detected by the device 102, the device 102 may perform steps 122 to 138 to display the screen output including the additional input events.

Figure 3:
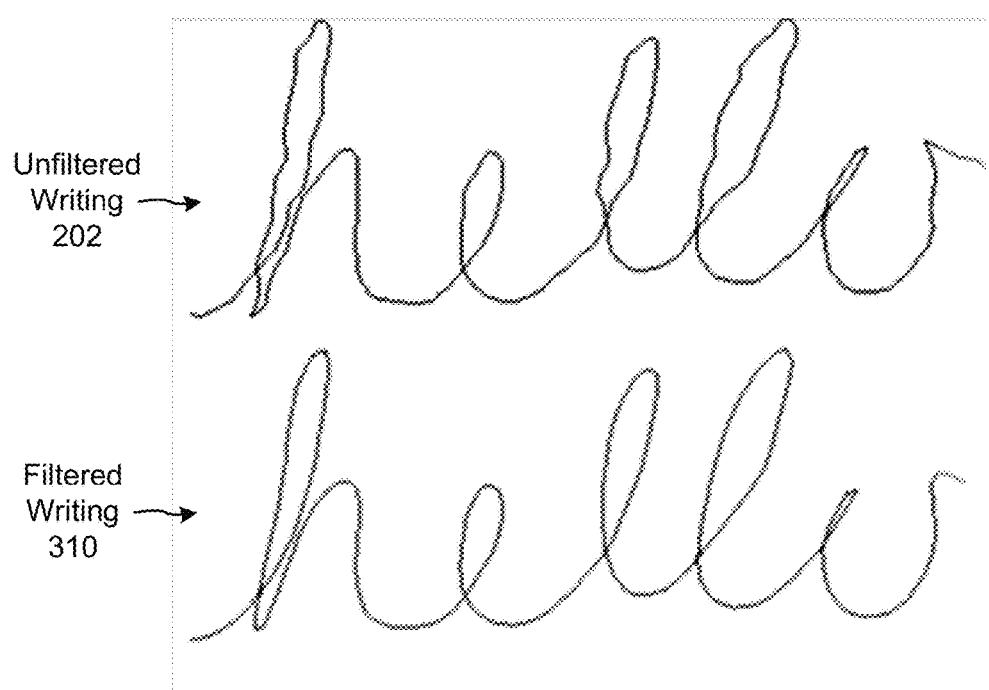
FIG. 3 illustrate examples of unfiltered writing and filtered writing according to embodiments of the present disclosure.

FIG. 3 illustrates an example of an input (unfiltered writing 202) and a corresponding output (filtered writing 310) according to embodiments of the present disclosure. In contrast to the filtered writing illustrated in FIGS. 2A-2C, filtered writing 310 is filtered based on a velocity and the filtering therefore varies based on a speed of writing. The filtering may use a low pass filter, such as a Chebyshev type II infinite impulse response (IIR) filter or other suitable filter. In some embodiments, the noise is caused by movement in a first direction (e.g., y direction) but exhibited in a second direction (e.g., x direction). Therefore, a cutoff frequency of the low pass filter may be chosen based on a relationship between a velocity in the first direction (e.g., y velocity) and a characteristic frequency of noise, such as a characteristic frequency generated by a non-linearity in the touch sensor. As an example, the characteristic frequency of noise may be 2.2 mm and the cutoff frequency may be calculated using an equation such as cutoff frequency=3.2*y-velocity, although the disclosure is not limited thereto. As another example, a plurality of low pass filters may be stored in a look-up table, with associated cutoff frequencies ranging from 1 Hz to 100 Hz (or other suitable range), and the device 102 may select a filter based on the velocity in the second direction. If a change in cutoff frequency exceeds a threshold (e.g., 5 Hz), the device 102 may gradually transition from a first filter to a second filter using intermediate cutoff frequencies. For example, if the first filter has a cutoff frequency of 10 Hz and the second filter has a cutoff frequency of 30 Hz, the device 102 may transition from the first filter to the second filter using intermediate filters having cutoff frequencies of 15 Hz, 20 Hz, 25 Hz to reduce a jaggedness in the output.

The first direction of the device 102 may be in a longitudinal direction, although the disclosure is not limited thereto. If movement is detected substantially in a second direction (such as a second direction perpendicular to the first direction), it may be difficult to select an appropriate filter due to minimal variation in the first direction. Thus, the device 102 may filter based on the velocity in the second direction until variation in the first direction exceeds a threshold. In addition, while examples illustrate the device 102 filtering in the (x, y) domain, the disclosure is not limited thereto. Instead, the device 102 may select a filter based on a velocity in a first direction (e.g., y direction) but may actually filter in the (r, θ) domain. For example, the device 102 may measure a distance [40] and an angle [θ(t)] between input events and may filter the angle [θ(t)] using the selected filter.

Using a filter having a low cutoff frequency may increase latency caused by the filter compared to a filter having a high cutoff frequency. However, as the filter is selected based on a writing speed detected by the device 102, the increased latency of the low cutoff frequency is associated with a slower writing speed that may offset the increased latency. For example, if the stylus 106 moves quickly across the display 104, an increased latency may result in a lag in distance between an input of the stylus 106 and an output on the display 104. In contrast, if the stylus 106 moves slowly across the display 104, the lag in distance between the input of the stylus 106 and the output on the display 104 may be less noticeable as the stylus 106 moves a shorter distance across the display 106.

One embodiment for improving the speed of rendering of stylus strokes involves separate layer hierarchy where one layer can display a stylus stroke quickly and another layer can show the stylus stroke after further processing (for example, by an application, etc.). The first, quick layer may be referred to as the overlay layer and the second, normal layer may be referred to as the application layer. Thus the first overlay layer may be updated separately from a normal view system/process of the operating system of the computing device (i.e., the application layer). The overlay hierarchy can be provided by a variety of components. Those components may include specially configured software to process data relating to stylus input events. Such overlay hierarchy allows data relating to stylus inputs to be pushed to the device display system separately from normal display data coming from applications of the computing device.

The overlay hierarchy/layer may process data for stylus input event(s) separately, and in parallel, to the traditional application level processing. Stylus input events are processed by the overlay hierarchy quickly so that strokes may appear on the display 104 faster than the conventional processing. In parallel, the stylus input events are processed by traditional application layer components so that underlying applications can also process input event data. The stylus strokes drawn by the overlay layer may then be reconciled with stylus strokes drawn by the application layer once the application layer has completed its processing. Thus, the initial display of a stroke corresponding to a stylus input event using the overlay hierarchy/layer is separated from the processing of the stylus input event by the underlying application hierarchy/layer.

This separation may thus improve the speed at which strokes corresponding to stylus input events are displayed on the screen. In this manner, stylus strokes displayed on the screen that result from overlay layer processing may be analogized to 'wet ink' drawn on a paper where 'wet ink' strokes (also called temporary strokes) refer to strokes that appear on the screen resulting from overlay layer processing. While certain processing steps are bypassed to quickly render and display the temporary strokes, the data corresponding to the stylus input event(s) may be passed to the application layer (for example, including the application content component) and processed in the conventional manner during 'wet ink' rendering and display. The results of the application layer processing (in terms of a stroke to be displayed) may be referred to as 'dry ink' strokes (also called processed strokes), that is a processed stroke representing data corresponding to stylus contact that has been processed by the application content layer of the computing device. The processed strokes are then sent to the display and may take the place of corresponding temporary strokes, thus reconciling strokes from the overlay layer with corresponding strokes from the application layer.

The terms 'wet ink' stroke (temporary stroke) and 'dry ink' stroke (processed stroke) here are meant to invoke the different stages in processing associated with the data corresponding to the stylus input event(s). It should be appreciated that the term 'wet ink' is not necessarily intended to imply a visual characteristic that looks different than 'dry ink.' That is, 'wet ink' strokes may appear identical to 'dry ink' strokes. However, in certain other embodiments, to enhance the user experience, the computing device may be configured to display the transition of 'wet ink' strokes to 'dry ink' strokes, for example by altering the associated strokes to mimic the look of ink drying on paper.

FIGS. 4A and 4B illustrate examples of two different ways of generating a filter using input events according to embodiments of the present disclosure. FIG. 4A illustrates input events used in generating an overlay layer filter 412, which may be referred to as a lower latency filter because the filter is generated based on previous input events, that is input events that have preceded a selected input event that will act as the reference point for the filtering operation. For example, for a selected input event 416 (shown as input event E5), the overlay layer filter 412 may use the most recent n input events (e.g., E1, E2, E3, E4 and E5 when n=5), where n is a natural number, to determine a velocity at the selected input event 416. Thus, the overlay layer filter 412 may calculate a trailing average using the input events. While the overlay layer filter 412 may calculate the velocity using fewer input events, such as only a single input event, fewer input events results in increases noise as the velocity may vary between subsequent input events.

The overlay layer filter 412 is a lower latency filter as the overlay layer filter 412 does not require input events subsequent to the selected input event 416 to determine the velocity, reducing a lag between detecting the selected input event 416 and rendering a corresponding point on the display 104. However, as the velocity is determined based on previous input events, the overlay layer filter 412 may not accurately predict future changes and therefore a cutoff frequency used by the overlay layer filter 412 may not be ideal.

FIG. 4B illustrates input events used in generating an application layer filter 414, which may be referred to as a higher latency filter because the filter is generated on both previous and subsequent input events. For example, for the selected input event 416 (shown as input event E5), the application layer filter 414 may use previous m input events (e.g., E3 and E4) and subsequent m input events (e.g., E6 and E7), where m is a natural number, to determine a velocity at the selected input event 416. The application layer filter 414 is a higher latency filter as the application layer filter 412 improves an accuracy of determining a cutoff frequency by using subsequent input events E6 and E7. However, the application layer filter 414 cannot determine a velocity for the selected input event 416 until the device 102 detects final input event (e.g. E7) used by the application layer filter 414. Using the application layer filter 414 results in a lag between detecting the selected input event 416 and rendering a corresponding point on the display 104, but the application layer filter 414 may result in a smoother rendering of the input. In addition to using subsequent input events, the application layer filter 414 may also use a more aggressive filter selection than the overlay layer filter 412, such as selecting a lower cutoff frequency for a particular velocity to attenuate more noise in the wave pattern. The lower cutoff frequency increases the latency caused by the filter, which is undesirable for the overlay layer filter 412.

Figure 5:
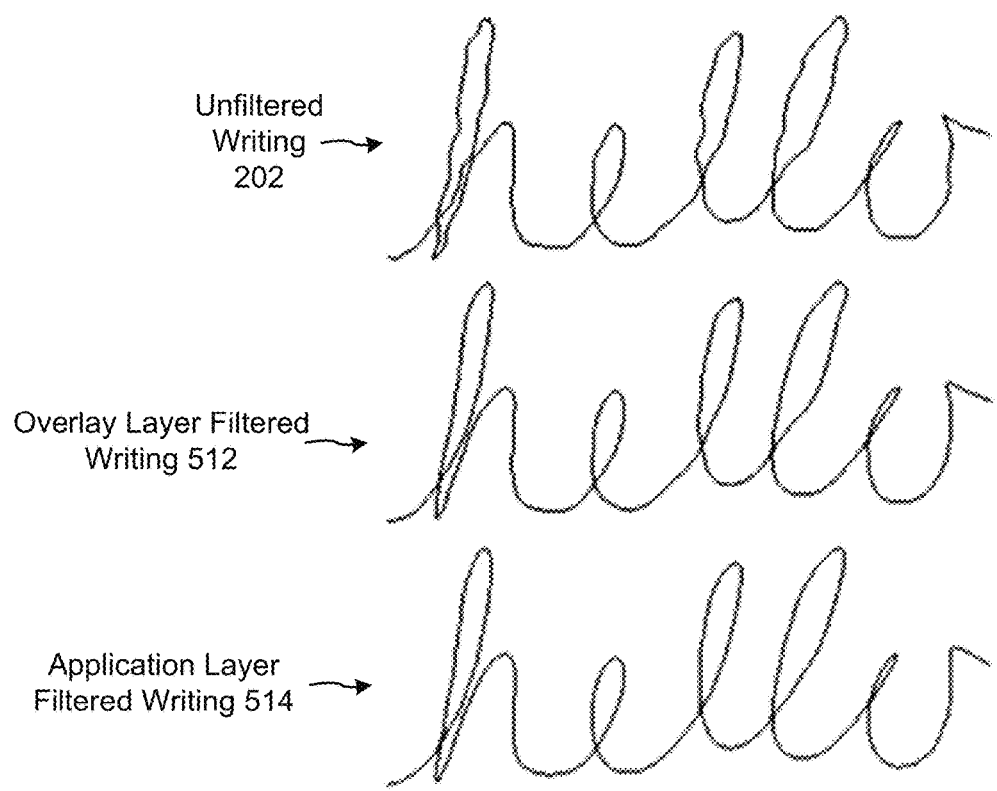
FIG. 5 illustrate examples of unfiltered writing, overlay layer filtered writing and application layer filtered writing according to embodiments of the present disclosure.

An example of differences between the overlay layer filter 412 and the application layer filter 414 is illustrated in FIG. 5, which illustrates examples of unfiltered writing 202, overlay layer filtered writing 512 and application layer filtered writing 514. The application layer filtered writing 514 appears smoother than the overlay layer filtered writing 512, reducing undesired noise and wave patterns. However, while the application layer filtered writing 514 appears smoother, the lag associated with the application layer filter 414 may translate into a poor, and undesired, user experience.

To provide the reduced lag associated with the overlay layer filter 412 while retaining the smoother filtering of the application layer filter 414, the device 102 may generate both the overlay layer filter 412 and the application layer filter 414. In a first embodiment, described in greater detail below with regard to FIGS. 6 and 7, the device 102 may display a first output generated using the overlay layer filter 412 during a stylus stroke and transition to displaying a second output generated using the application layer filter 414 upon completion of the stylus stroke. In a second embodiment, described in greater detail below with regard to FIGS. 8, 9 and 10, the device 102 may generate a first output using the overlay layer filter 412 and generate a second output using the application layer filter 414 and display both the first output and the second output, transitioning from the overlay layer filter 412 to the application layer filter 414 after a desired number of input events. In this manner, the display may originally show stylus strokes as processed by the overlay layer filter 412, and then, once sufficient samples have been gathered to execute the application layer filter 414, apply the application layer filter 414 and replace the strokes resulting from the overlay layer filter 412 with strokes resulting from the application layer filter 414. As discussed above, in addition to using additional samples the application layer filter 414 may also use a more aggressive filter selection than the overlay layer filter 412, such as selecting a lower cutoff frequency for a particular velocity to attenuate more noise in the wave pattern. Thus, the displayed strokes may appear to "correct" themselves as the stylus writing continues (albeit in a time frame measured in milliseconds).

Figure 6:
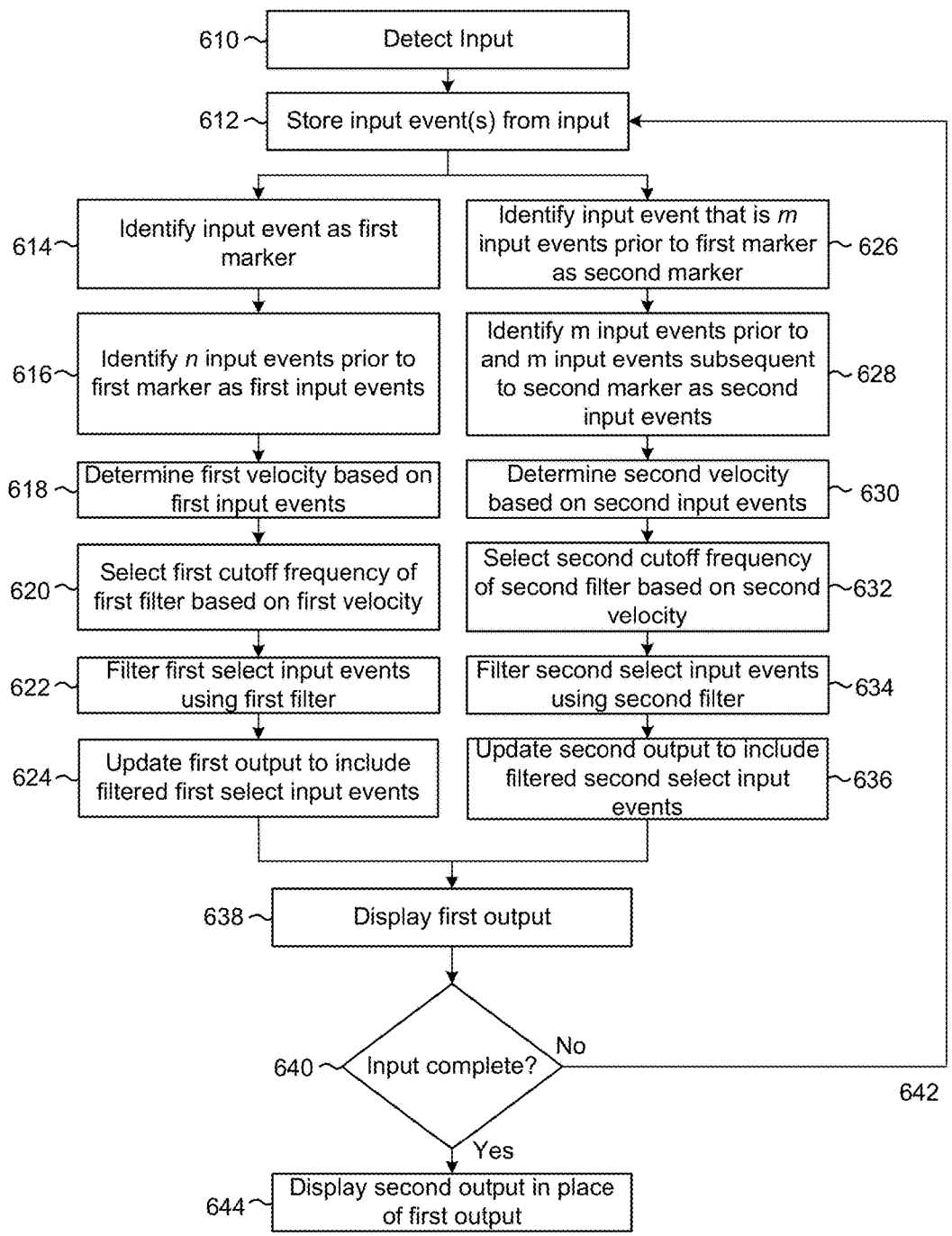
FIG. 6 illustrates a flowchart conceptually illustrating an example method for implementing an overlay layer filter during a stylus stroke and an application layer filter after the stylus stroke is completed according to embodiments of the present disclosure.

FIG. 6 illustrates a flowchart conceptually illustrating an example method for implementing an overlay layer filter 412 during a stylus stroke and an application layer filter 414 after the stylus stroke is completed according to embodiments of the present disclosure. For example, the device 102 may detect (610) an input such as a stylus stroke including input events. The device 102 may store (612) input event(s) from the input. As the input events (i.e., detected stylus contact points) are stored, the device 102 may perform a first series of steps to filter the input events using the overlay layer filter 412 and a second series of steps to filter the input events using the application layer filter 414. While FIG. 6 illustrates the first series of steps and the second series of steps occurring simultaneously, the disclosure is not limited thereto. In some embodiments, the device 102 may perform the first series of steps concurrent with receiving an input event to reduce a lag between detecting the input event and rendering the input event on the display 104, while performing the second series of steps a desired number of input events after receiving the input event to include additional input events. In other embodiments, the device 102 may perform the first series of steps concurrent with receiving input events while performing the second series of steps after the stylus stroke is completed.

To initiate the first series of steps, the device 102 may identify (614) an input event as a first marker and may identify (616) n input events prior to and including the first marker as first input events. For example, referring to FIG. 4A, the device 102 may identify a fifth input event E5 as the first marker and therefore identify input events E1, E2, E3, E4 and E5 (when n=5) as the first input events. The device 102 may determine (618) a first velocity in a first direction based on the first input events. For example, the device 102 may calculate a position difference between coordinates of the first input event E1 and the fifth input event E5 in the first direction and a time difference between timestamps of the first input event E1 and the fifth input event E5 and determine a velocity in the first direction based on the position difference and the time difference.

The device 102 may select (620) a first cutoff frequency of a first filter based on the first velocity. For example, the device 102 may calculate the first cutoff frequency using a formula or may use a lookup table to select the first cutoff frequency. However, the disclosure is not limited thereto. In some embodiments, the device 102 may select the first cutoff frequency of the first filter only during a filter refresh. The device 102 may refresh the first filter based on time (e.g. refresh rate of 20 Hz), distance (e.g., once a distance between a first input event and a subsequent input event exceeds a threshold) and/or velocity (e.g., a change in velocity exceeding a threshold). Thus, while the device 102 may repeatedly monitor first input events and determine the first velocity and/or the first cutoff frequency, the device 102 may refresh the first filter at desired intervals (in time or distance) and/or based on a change in the first cutoff frequency. In addition, if the first velocity and corresponding first cutoff frequency changes drastically in a short period of time, the device 102 may refresh the first filter in a series of intervals to gradually switch between the opposite extremes and smoothly render the input. For example, if the first cutoff frequency changes abruptly from 6 Hz to 18 Hz, the device 102 may transition from 6 Hz to 10 Hz to 14 Hz to 18 Hz instead of jumping directly from 6 Hz to 18 Hz.

The device 102 may filter (622) first select input events using the first filter. For example, the device 102 may filter input events associated with the first filter or input events received since the most recent first filter refresh. The device 102 may update (624) a first output to include the filtered first select input events from step 622. For example, the device 102 may generate the first output after detecting an initial input event and gradually update the first output as additional input events are received and filtered.

To initiate the second series of steps, the device 102 may identify (626) an input event that is m input events prior to the first marker as a second marker. For example, the application layer filter 414 illustrated in FIG. 4B includes two additional input events prior to (E3 and E4) and subsequent to (E6 and E7) the selected input event 416, so m is equal to 2. Thus, if the first marker set in step 614 is the fifth input event E5, the device 102 may identify the third input event E3 as the second marker (when m=2). The device 102 may identify (628) m input events prior to and m input events subsequent to the second marker, along with the second marker, as second input events. For example, if the second marker is the third input event E3 and m=2, the device 102 may identify input events E1, E2, E3, E4 and E5 as the second input events. The device 102 may determine (630) a second velocity in the first direction based on the second input events. For example, the device 102 may calculate a third difference between coordinates of the first input event E1 and the fifth input event E5 in the first direction and a fourth difference between timestamps of the first input event E1 and the fifth input event E5 and determine a second velocity in the first direction based on the third difference and the fourth difference.

While the examples listed above use the same input events (E1-E5) for the first input events and the second input events, the disclosure is not limited thereto. The first input events are used to determine the first velocity for the fifth input event E5, whereas the second input events are used to determine the second velocity for the third input event E3. In these examples, the first input events and the second input events are identical due to the offset (m) and the range (n) chosen. For example, if the offset (m) was set to 3, the second marker would be the second input event E2 and the second input events would include input events E0-E5. Similarly if the range (n) was set to 4, the first input events would include input events E2-E5.

The device 102 may select (632) a second cutoff frequency of a second filter based on the second velocity. The device 102 may select the second cutoff frequency of the second filter using a more aggressive filter selection than the first cutoff frequency of the first filter, such as selecting a lower cutoff frequency for a particular velocity to attenuate more noise in the wave pattern. The lower cutoff frequency increases the latency caused by the second filter, which is undesirable for the first filter. As an example, the device 102 may calculate the second cutoff frequency using a formula or may use a lookup table to select the second cutoff frequency. However, the disclosure is not limited thereto. In some embodiments, the device 102 may select the second cutoff frequency of the second filter only during a filter refresh. The device 102 may refresh the second filter based on time (e.g., refresh rate of 20 Hz), distance (e.g., once a distance between a first input event and a subsequent input event exceeds a threshold) and/or velocity (e.g., a change in velocity exceeding a threshold). The device 102 may refresh the second filter more frequently than, less frequently than or at the same rate as refreshing the first filter. Thus, while the device 102 may repeatedly monitor second input events and determine the second velocity and/or the second cutoff frequency, the device 102 may refresh the second filter at desired intervals (in time or distance) and/or based on a change in the second cutoff frequency. In addition, if the second velocity and corresponding second cutoff frequency changes drastically in a short period of time, the device 102 may refresh the second filter in a series of intervals to gradually switch between the opposite extremes and smoothly render the input. For example, if the second cutoff frequency changes abruptly from 6 Hz to 18 Hz, the device 102 may transition from 6 Hz to 10 Hz to 14 Hz to 18 Hz instead of jumping directly from 6 Hz to 18 Hz.

The device 102 may filter (634) second select input events using the second filter. For example, the device 102 may filter input events associated with the second filter or input events received since the most recent second filter refresh. The device 102 may update (636) a second output to include the filtered second select input events from step 634. For example, the device 102 may generate the second output after detecting an initial input event and gradually update the second output as additional input events are received and filtered.

The device 102 may display (638) the first output on the display 104 of the device 102 during the stylus stroke. For example, the device 102 may display the first output while the device 102 detects contact between the stylus 106 and the display 104.

Figure 7:
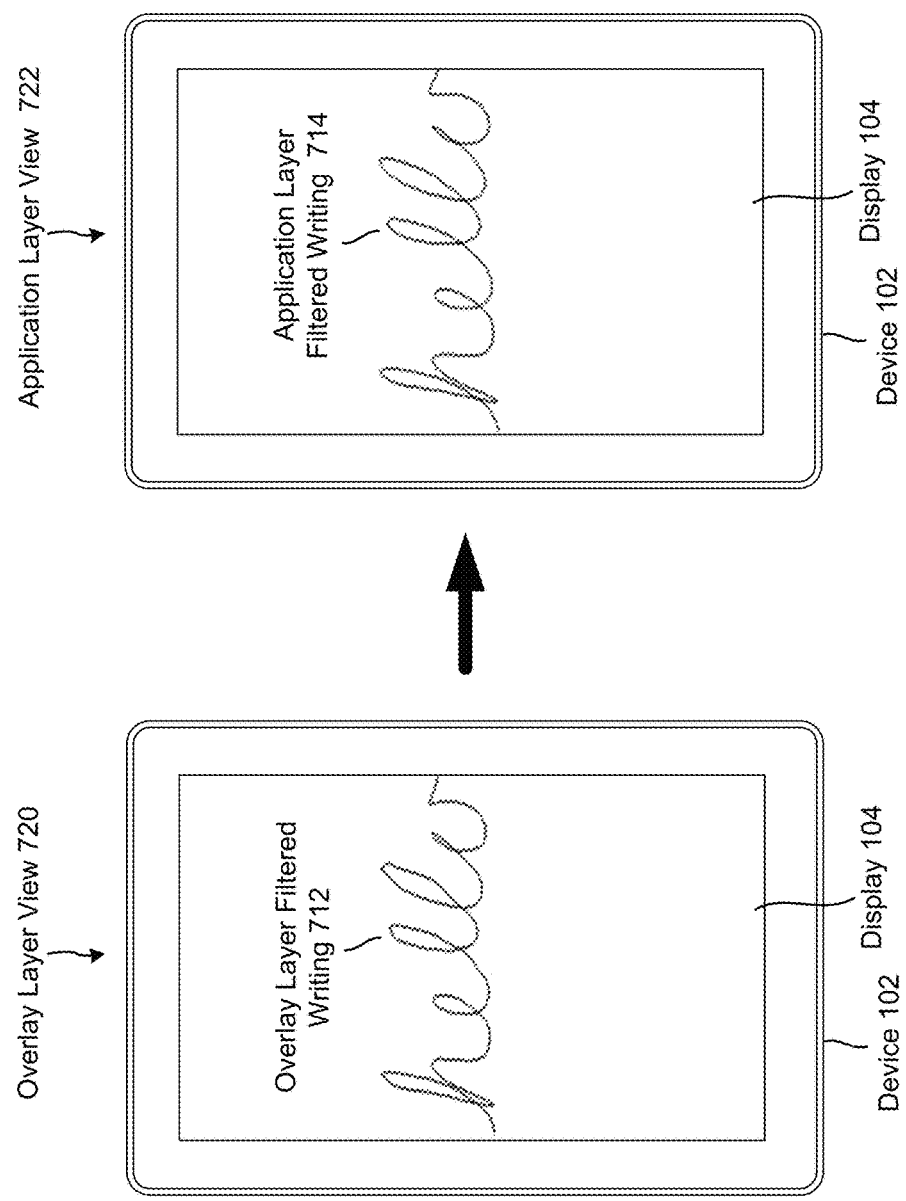
FIG. 7 illustrates an example of the overlay layer filter transitioning to the application layer filter after a stylus stroke is completed according to embodiments of the present disclosure.

The device 102 may determine (640) if input to the device is complete. For example, the device 102 may determine if the stylus stroke is continuing or if the stylus 106 is no longer in contact with the display 104. If the input to the device 102 is not complete, the device 102 may loop (642) to step 612 and repeat the steps described above. If the input to the device 102 is complete, the device 102 may display (644) the second output on the display 104 of the device 102 in place of the first output. For example, as illustrated in FIG. 7, the device 102 may transition from overlay layer view 720, which displays the overlay layer filtered writing 712 during a stylus stroke, to application layer view 722, which displays the application layer filtered writing 714 after completion of the stylus stroke.

Figure 8:
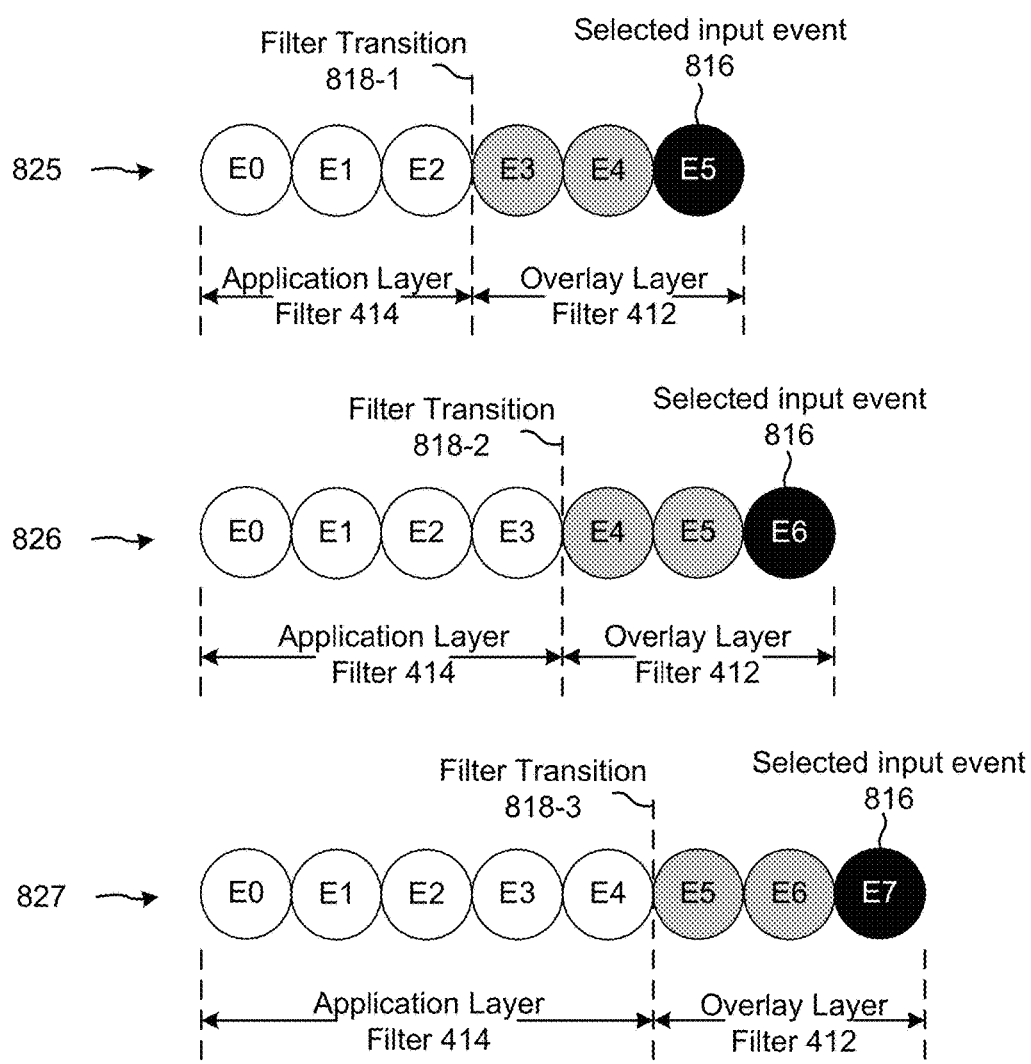
FIG. 8 illustrates an example of generating an output by transitioning the overlay layer filter to the application layer filter according to embodiments of the present disclosure.

FIG. 8 illustrates an example of generating an output by transitioning an overlay layer filter 412 to an application layer filter 414 according to embodiments of the present disclosure. At a first moment 825, a fifth input event E5 is detected and chosen as selected input event 816. The selected input event 816 may be filtered using the overlay layer filter 412 based on previous input events (e.g., input events E1-E5 if n=5). Due to a delay waiting for additional input events, detecting the fifth input event E5 during the first moment 825 allows the application layer filter 414 to filter the second input event E2 using previous and subsequent input events (e.g., input events E0-E5 if m=3). Therefore, a filter transition 818-1 occurs between input events up to and including the second input event E2, which are filtered using the application layer filter 414, and input events subsequent to the second input event E2, which are filtered using the overlay layer filter 412.

At a second moment 826, a sixth input event E6 is detected and chosen as selected input event 816. The selected input event 816 may be filtered using the overlay layer filter 412 based on previous input events (e.g., input events E2-E6 if n=5). Detecting the sixth input event E6 during the second moment 826 allows the application layer filter 414 to filter the third input event E3 using previous and subsequent input events (e.g., input events E0-E6 if m=3). Therefore, a filter transition 818-2 occurs between input events up to and including the third input event E3, which are filtered using the application layer filter 414, and input events subsequent to the third input event E3, which are filtered using the overlay layer filter 412.

At a third moment 827, a seventh input event E7 is detected and chosen as selected input event 816. The selected input event 816 may be filtered using the overlay layer filter 412 based on previous input events (e.g., input events E3-E7 if n=5). Detecting the seventh input event E7 during the third moment 827 allows the application layer filter 414 to filter the fourth input event E4 using previous and subsequent input events (e.g., input events E1-E7 if m=3). Therefore, a filter transition 818-3 occurs between input events up to and including the fourth input event E4, which are filtered using the application layer filter 414, and input events subsequent to the fourth input event E4, which are filtered using the overlay layer filter 412.

Thus, as the device 102 detects each additional input event (e.g., E5 in first moment 825, E6 in second moment 826, E7 in third moment 827), the device 102 filters the input event using the overlay layer filter 412 and adds the filtered input event to the output. At the same time, the device 102 filters a previous input event (e.g., E2 in first moment 825, E3 in second moment 826, E4 in third moment 827) with the application layer filter 414 and replaces an overlay-filtered input event in the output with the corresponding application-filtered input event. Therefore, as the device 102 displays the output, the overlay layer filter 412 is used for the most recent input events and the application layer filter 414 is used for other input events.

While FIG. 8 illustrates the device 102 transitioning from the overlay layer filter 412 to the application layer filter 414, the disclosure is not limited thereto. Instead, the device 102 may display an unfiltered input event and transition to the overlay layer filter 412 after a number of input events. In a first example, the device 102 may transition from the unfiltered input event to the overlay layer filter 412 or the application layer filter 414. In a second example, the device 102 may transition from the unfiltered input event to the overlay layer filter 412, and at the end of the stylus stroke, transition from the overlay layer filter 412 to the application layer filter 414 as illustrated in FIGS. 6-7. In a third example, the device 102 may transition from the unfiltered input event to the overlay layer filter 412 as illustrated in FIG. 8 and then transition from the overlay layer filter 412 to the application layer filter 414 as illustrated in FIG. 8.

Figure 9:
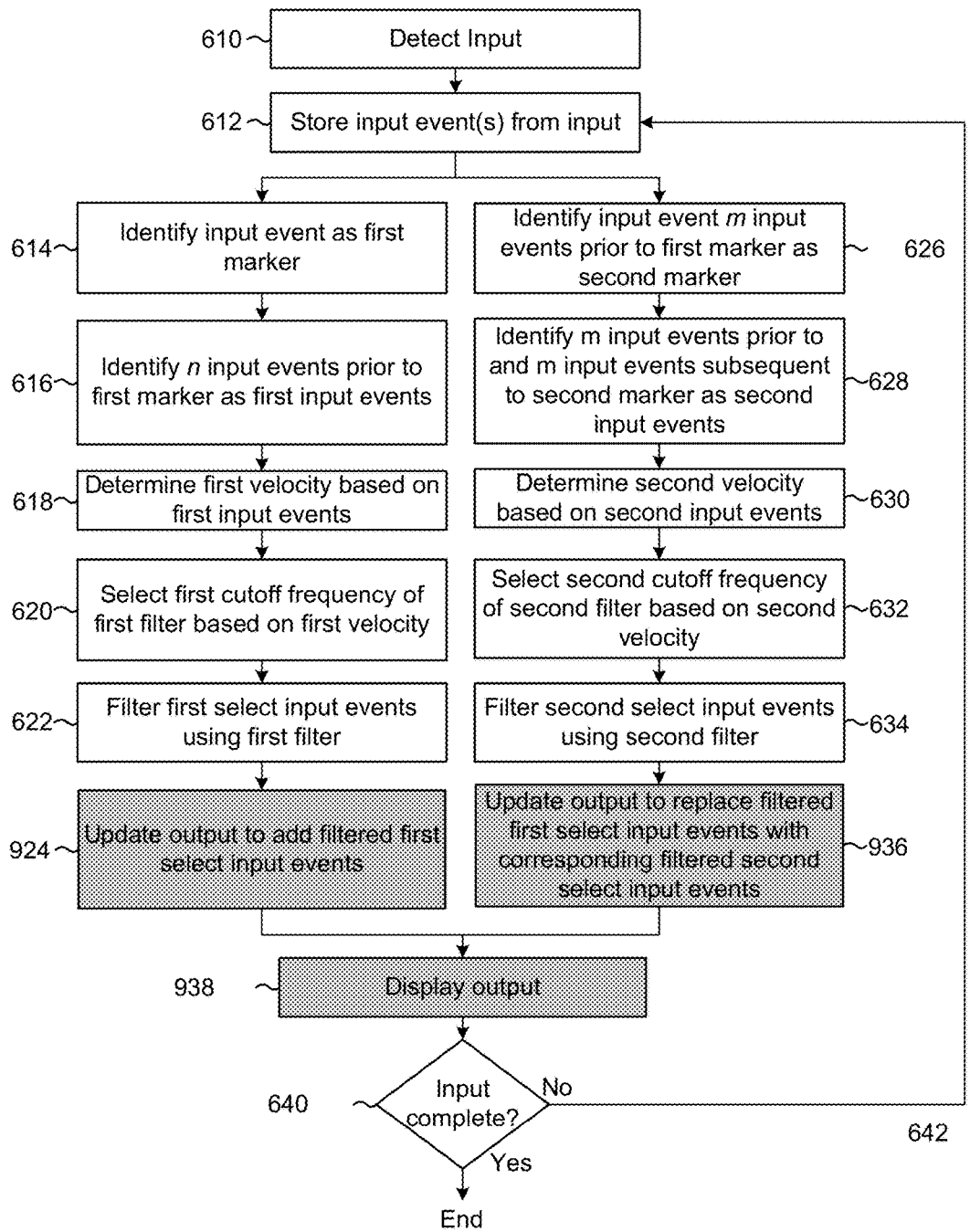
FIG. 9 illustrates a flowchart conceptually illustrating an example method for generating an output by transitioning an overlay layer filter to a delayed application layer filter during a stylus stroke according to embodiments of the present disclosure.

FIG. 9 illustrates a flowchart conceptually illustrating an example method for generating an output by transitioning an overlay layer filter to a delayed application layer filter during a stylus stroke according to embodiments of the present disclosure. The method illustrated in FIG. 9 shares several steps with the method illustrated in FIG. 6, and therefore a corresponding description is omitted.

For example, the device 102 may detect (610) an input such as a stylus stroke including input events and may store (612) input event(s) from the input as described above. As the input events are stored, the device 102 may perform a first series of steps to filter the input events using the overlay layer filter 412 and a second series of steps to filter the input events using the application layer filter 414. While FIG. 9 illustrates the first series of steps and the second series of steps occurring simultaneously, the disclosure is not limited thereto. In some embodiments, the device 102 may perform the first series of steps concurrent with receiving an input event to reduce a lag between detecting the input event and rendering the input event on the display 104, while performing the second series of steps a desired number of input events after receiving the input event to include additional input events.

After performing steps 614-622 to filter the first select input events using the first filter, the device 102 may update (924) an output to add the filtered first select input events. For example, the device 102 may generate the output after detecting an initial input event and update the output as additional input events are received and filtered. As illustrated in FIG. 8, the device 102 may add the additional input event to the end of the output.

After performing steps 626-634 to filter the second select input events using the second filter, the device 102 may update (936) the output to replace a filtered first select input event with the corresponding filtered second select input events from step 634. For example, as the device 102 detects an additional input event, the device 102 may update the output to replace an overlay-filtered input event with an application-filtered input event and move the filter transition 818.

The device 102 may display (938) the output on the display 104, updating the display 104 based on changes to the output described above. For example, as each additional input event is detected by the device 102, the device 102 may filter the first select input events using the first filter, adding the filtered first select input events to the output, and filter the second select input events using the second filter, replacing filtered first select input events with the corresponding filtered second select input events. Thus, as illustrated in FIG. 8, the filter transition 818 moves according to a location of the most recent input event (selected input event 816) and the overlay layer filter 412 is gradually replaced by the application layer filter 414.

As described above with regard to FIG. 6, the device 102 may determine (640) if input to the device is complete and may loop (642) to step 612 and repeat the steps described above. If the input to the device 102 is complete, the process may end once all input events are filtered using the application layer filter 414.

Steps 924, 936 and 938 illustrate the difference between the method described with regard to FIG. 6 and the method described with regard to FIG. 9. For example, the method illustrated in FIG. 6 generates a first output using the overlay layer filter 412 and a second output using the application layer filter 414, but displays the first output until the input to the device is complete. As illustrated in FIG. 7, this results in a fast transition between the overlay layer filter 412 and the application layer filter 414, which may result in a poor user experience. In contrast, the method illustrated in FIG. 9 generates a combined output using the overlay layer filter 412 and the application layer filter 414 and the device 102 displays the combined output, which smoothly transitions from the overlay layer filter 412 to the application layer filter 414 as additional input events are detected.

While FIG. 9 illustrates the first series of steps filtering input events, the disclosure is not limited thereto. In some embodiments, the device 102 may generate the output using unfiltered input events and may update the output in step 936 to replace unfiltered input events with corresponding filtered second select input events. This may result in a reduced lag between detecting an input and displaying the input, but may translate into a poor, and undesired, user experience due to the lack of filtering. In other embodiments, the device 102 may generate the output using the unfiltered input events, may update the output in step 924 to replace unfiltered input events with corresponding filtered first second select input events, and may later update the output in step 936 to replace filtered first second select input events with corresponding filtered second select input events. This may result in a reduced lag between detecting an input and displaying the input while providing first filtering after a brief delay and second filtering after a longer delay.

Figure 10:
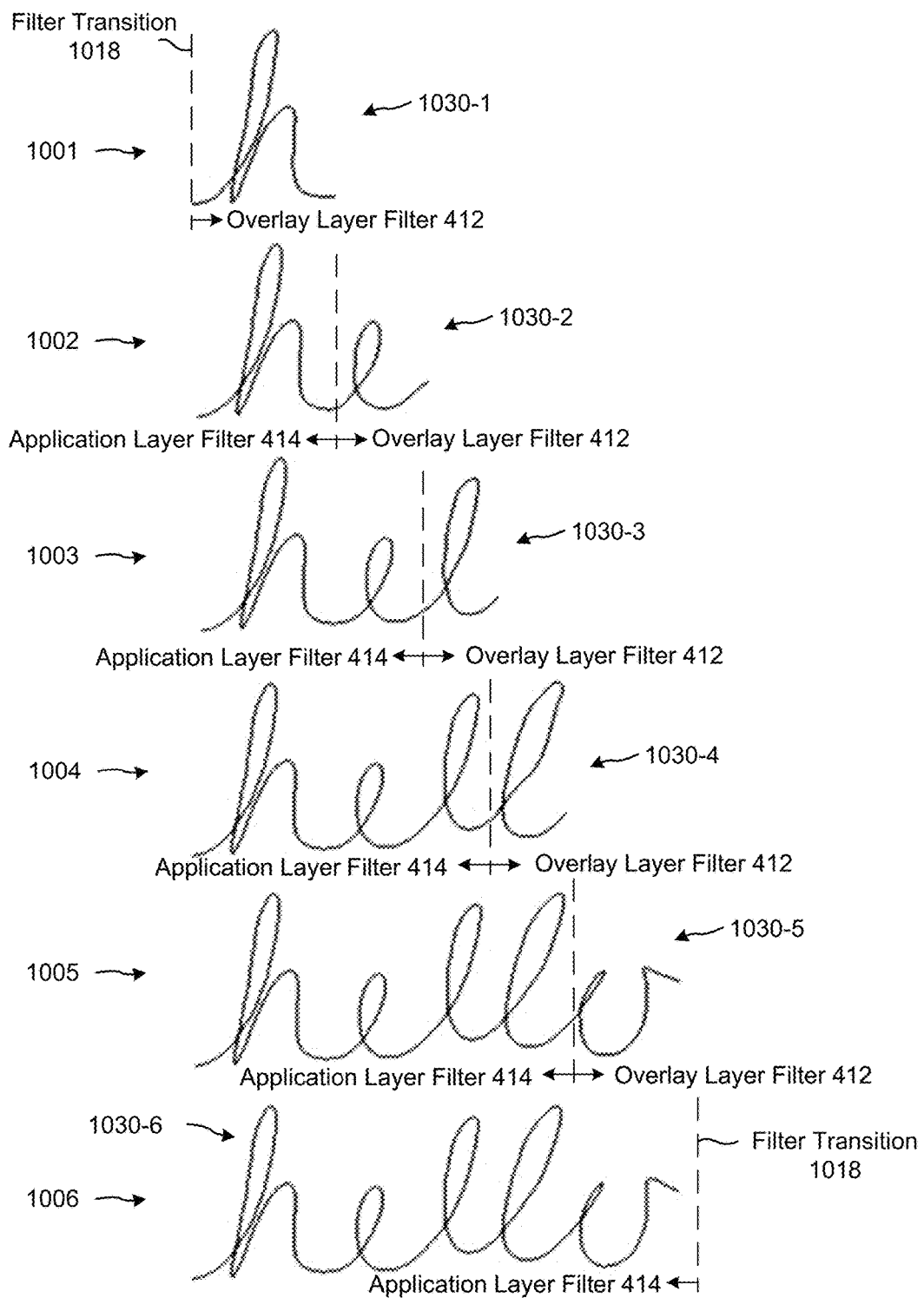
FIG. 10 illustrates examples of the overlay layer filter transitioning to the application layer filter during a stylus stroke according to embodiments of the present disclosure.

FIG. 10 illustrates examples of the overlay layer filter 412 transitioning to the application layer filter 414 during a stylus stroke according to embodiments of the present disclosure. As illustrated in FIG. 10, the device 102 is detecting an input from a stylus 106 and displaying an output 1030.

At a first moment 1001, the device 102 has detected input events corresponding to a letter "h" and filtered the letter "h" using the overlay layer filter 412. However, the device 102 has not filtered the letter "h" using the application layer filter 414. Thus, a first output 1030-1 includes the letter "h" filtered by the overlay layer filter 412 and a filter transition 1018 is shown prior to the beginning of the letter "h."

At a second moment 1002, the device 102 has detected additional input events corresponding to a letter "e." The device 102 filtered the letters "he" using the overlay layer filter 412 and, due to the additional input events available in the second moment 1002, filtered the letter "h" using the application layer filter 414. After filtering the letter "h" using the application layer filter 414, the device 102 replaces the "h" filtered using the overlay layer filter 412 with the "h" filtered using the application layer filter 414 in a second output 1030-2. Thus, the second output 1030-2 includes the letter "h" filtered by the application layer filter 414 and the letter "e" filtered by the overlay layer filter 412, moving the filter transition 1018 between the "h" and the "e."

At a third moment 1003, the device 102 has detected additional input events corresponding to a letter "l." The device 102 filtered the letters "hel" using the overlay layer filter 412 and, due to the additional input events available in the third moment 1003, filtered the letters "he" using the application layer filter 414. After filtering the letter "e" using the application layer filter 414, the device 102 replaces the "e" filtered using the overlay layer filter 412 with the "e" filtered using the application layer filter 414 in the third output 1030-3. Thus, a third output 1030-3 includes the letters "he" filtered by the application layer filter 414 and the letter "l" filtered by the overlay layer filter 412, moving the filter transition 1018 between the "e" and the "l."

At a fourth moment 1004, the device 102 has detected additional input events corresponding to a second letter "l." The device 102 filtered the letters "hell" using the overlay layer filter 412 and, due to the additional input events available in the fourth moment 1004, filtered the letters "hel" using the application layer filter 414. After filtering the letter "l" using the application layer filter 414, the device 102 replaces the "l" filtered using the overlay layer filter 412 with the "l" filtered using the application layer filter 414 in a fourth output 1030-4. Thus, the fourth output 1030-4 includes the letters "hel" filtered by the application layer filter 414 and the letter "l" filtered by the overlay layer filter 412, moving the filter transition 1018 between the first "l" and the second "l."

At a fifth moment 1005, the device 102 has detected additional input events corresponding to a letter "o." The device 102 filtered the letters "hello" using the overlay layer filter 412 and, due to the additional input events available in the fifth moment 1005, filtered the letters "hell" using the application layer filter 414. After filtering the second letter "l" using the application layer filter 414, the device 102 replaces the "l" filtered using the overlay layer filter 412 with the "l" filtered using the application layer filter 414 in a fifth output 1030-5. Thus, the fifth output 1030-5 includes the letters "hell" filtered by the application layer filter 414 and the letter "o" filtered by the overlay layer filter 412, moving the filter transition 1018 between the second "l" and the "o."

At a sixth moment 1006, the device 102 has detected that the stylus stroke is complete. The device 102 filtered the letters "hello" using the overlay layer filter 412 and, after a delay, filtered the letters "hello" using the application layer filter 414. After filtering the letter "o" using the application layer filter 414, the device 102 replaces the "o" filtered using the overlay layer filter 412 with the "o" filtered using the application layer filter 414 in a sixth output 1030-6. Thus, the sixth output 1030-6 includes the letters "hello" filtered by the application layer filter 414 and the filter transition 1018 shown subsequent to the letter "o."

FIG. 10 is intended merely as an illustration and the disclosure is not limited thereto. For example, a delay between the overlay layer filter 412 and the application layer filter 414 may be reduced such that the filter transition 1018 is relatively close to the most recent input event. Thus, instead of transitioning the output from the overlay layer filter 412 to the application layer filter 414 letter by letter, the device 102 may transition the output from the overlay layer filter 412 to the application layer filter 414 within a fraction of each letter.

Figure 11:
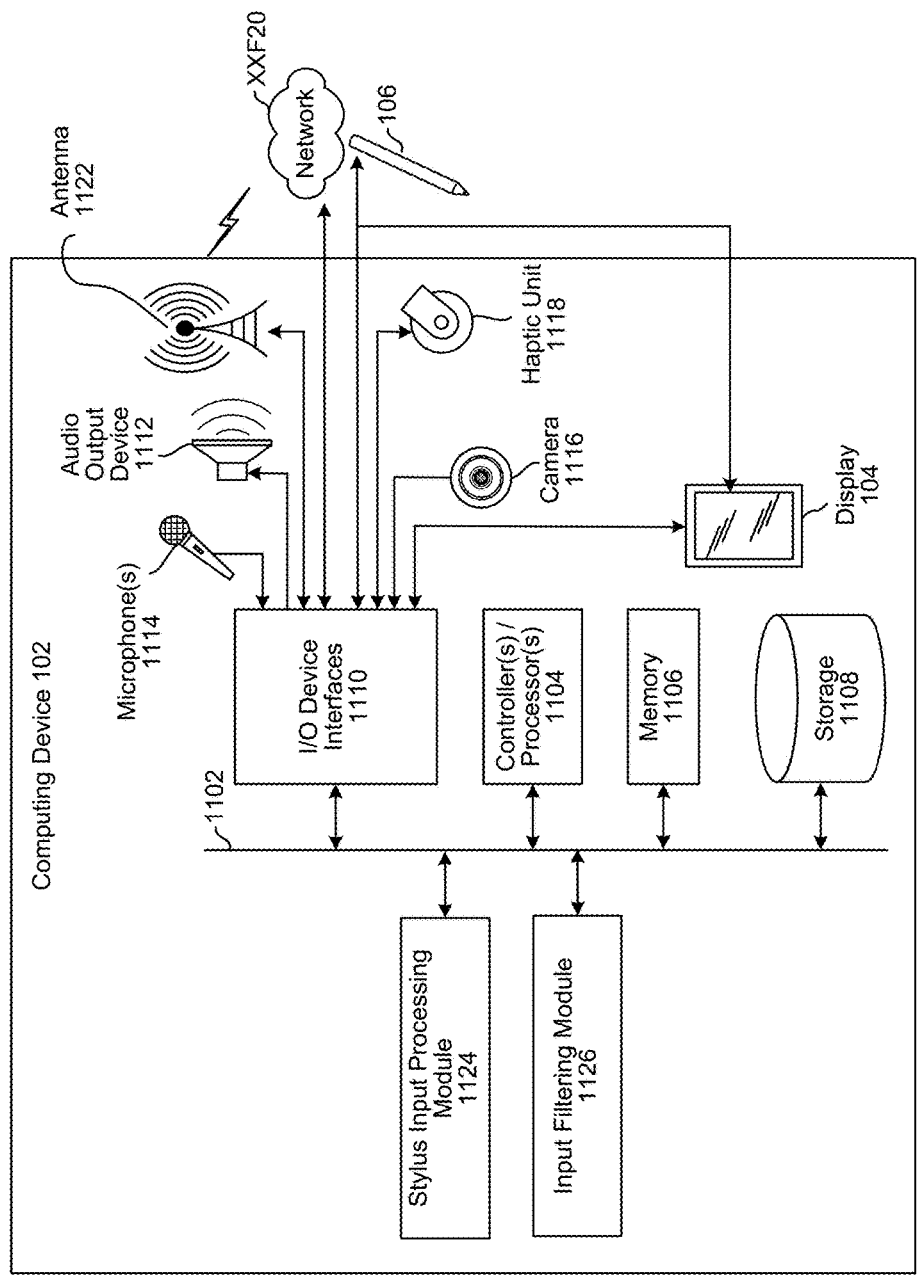
FIG. 11 is a block diagram conceptually illustrating example components of a computing device according to embodiments of the present disclosure.

FIG. 11 is a block diagram conceptually illustrating example components of the computing device 102. In operation, the computing device 102 may include computer-readable and computer-executable instructions that reside on the computing device 102, as is discussed further below.

As illustrated in FIG. 11, the computing device 102 may include an address/data bus 1102 for conveying data among components of the computing device 102. Each component within the computing device 102 may also be directly connected to other components in addition to (or instead of) being connected to other components across the bus 1102.

The computing device 102 may include one or more microcontrollers/controllers/processors 1104 that may each include a central processing unit (CPU) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The computing device 102 may also include a data storage component 1108, for storing data and microcontrollers/controller/processor-executable instructions (e.g., instructions to perform one or more steps of the methods illustrated in and described with reference to FIG. 1, 6 or 8). The data storage component 1108 may include one or more non-volatile storage types such as magnetic storage, optical storage, solid-state storage, etc. The computing device 102 may also be connected to removable or external non-volatile memory and/or storage (such as a removable memory card, memory key drive, networked storage, etc.) through input/output device interfaces 1110.

Computer instructions for operating the computing device 102 and its various components may be executed by the microcontroller(s)/controller(s)/processor(s) 1104, using the memory 1106 as temporary "working" storage at runtime. The computer instructions may be stored in a non-transitory manner in non-volatile memory 1106, storage 1108, or an external device. Alternatively, some or all of the executable instructions may be embedded in hardware or firmware in addition to or instead of software.

The computing device 102 includes input/output device interfaces 1110. A variety of components may be connected through the input/output device interfaces 1110, such as the display or display screen 104 having a touch surface or touchscreen; an audio output device for producing sound, such as speaker(s) 1112; one or more audio capture device(s), such as a microphone or an array of microphones 1114; one or more image and/or video capture devices, such as camera(s) 1116; one or more haptic units 1118; and other components. The display 104, speaker(s) 1112, microphone(s) 1114, camera(s) 1116, haptic unit(s) 1118, and other components may be integrated into the computing device 102 or may be separate.

The display 104 may be a video output device for displaying images. The display 104 may be a display of any suitable technology, such as a liquid crystal display, an organic light emitting diode display, electronic paper, an electrochromic display, a cathode ray tube display, a pico projector or other suitable component(s). The display 104 may also be implemented as a touchscreen and may include components such as electrodes and/or antennae for use in detecting stylus input events or detecting when a stylus is hovering above, but not touching, the display 104, as described above.

The input/output device interfaces 1110 may also include an interface for an external peripheral device connection such as universal serial bus (USB), FireWire, Thunderbolt, Ethernet port or other connection protocol that may connect to networks 1220. The input/output device interfaces 1110 may also include a connection to antenna 1122 to connect one or more networks 1220 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The stylus 106 may connect to the computing device 102 via one of these connections. The touchscreen of the display 104 and the stylus 106 may also communicate data or operating information to one another to enable the computing device 102 to determine a position of the stylus 106 relative to the touchscreen. The stylus 106 may also communicate to the device 102 (either through the display 104) or otherwise, information about the stylus such as a stylus identifier, user identifier, or other information. Additionally, in some embodiments, the computing device 102 (for example, the touchscreen) and the stylus 106 may communicate using electromagnetic communications (for example, electric fields generated by each device to transmit data on a carrier frequency), and/or haptic communications.

The computing device 102 further includes a stylus input processing controllers/modules 1124 that interacts with the stylus 106 to detect stylus inputs. Those stylus inputs may include locating a stylus tip when the tip contacts the touchscreen 104. Those stylus inputs may also include when the stylus hovers over, but does not touch the touchscreen 104. Using the various communication components of the device 102 and stylus 106, the stylus input processing module 1124 may determine the location of the tip of the stylus 106 during a hover and/or contact with the touchscreen 104. Some or all of the controllers/modules of the stylus input processing controllers/modules 1124 may be executable instructions that may be embedded in hardware or firmware in addition to, or instead of, software. In one embodiment, the computing device 102 may operate using an Android® operating system (such as, Android® 4.3 Jelly Bean and/or Android® 4.4 KitKat).

The computing device 102 may further include a input filtering module 1126. The input filtering module 1126 may control filtering of an input to the device 102 as discussed above, specifically with regard to FIGS. 1, 6 and/or 8.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc. that can operate with a touchscreen.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware, and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for displaying a line corresponding to contact between a stylus and a device, the computer-implemented method comprising:
    determining a plurality of input events corresponding to a stroke input, the plurality of input events corresponding to multiple points of contact on a touchscreen display of the device, each of the multiple points of contact having respective coordinates at which the touchscreen display detects contact;
    identifying some of the plurality of input events as first input events, the first input events including a selected input event;
    identifying some of the plurality of input events as second input events, the second input events occurring at times prior to a time of the selected input event;
    determining a first velocity of the stroke input based on the first input events;
    determining a second velocity of the stroke input based on the second input events;
    selecting a first cutoff frequency of a first filter based on the first velocity;
    selecting a second cutoff frequency of a second filter based on the second velocity;
    removing first high frequency components of the plurality of input events using the first filter to generate first filtered inputs, the first high frequency components having frequencies above the first cutoff frequency;
    removing second high frequency components of the plurality of input events using the second filter to generate second filtered inputs, the second high frequency components having frequencies above the second cutoff frequency;
    generating a first output using the first filtered inputs, the first output corresponding to a first filtered version of the stroke input;
    displaying the first output on the touchscreen display;
    generating a second output using the second filtered inputs, the second output corresponding to a second filtered version of the stroke input; and
    displaying the second output on the touchscreen display after displaying the first output.

2. The computer-implemented method of claim 1, wherein:
    identifying some of the plurality of input events as the first input events further comprises identifying the selected input event as a most recent input event of the plurality of input events, and
    the first input events are a determined number of input events prior to and including the most recent input event.

3. The computer-implemented method of claim 1, wherein:
    identifying some of the plurality of input events as the second input events further comprises identifying a center input event of the plurality of input events, and
    the second input events are a determined number of input events of the plurality of input events centered on the center input event.

4. The computer-implemented method of claim 1, further comprising:
    determining a third velocity of the stroke input between a first input event of the first input events and a second input event of the first input events;
    determining a fourth velocity of the stroke input between the second input event of the first input events and a third input event of the first input events;
    determining the first velocity by averaging the third velocity and the fourth velocity;
    determining a fifth velocity of the stroke input between a first input event of the second input events and a second input event of the second input events;
    determining a sixth velocity of the stroke input between the second input event of the second input events and a third input event of the second input events; and
    determining the second velocity by averaging the fifth velocity and the sixth velocity.

5. A computer-implemented method, comprising:
    determining a plurality of input events corresponding to a stroke input, the plurality of input events corresponding to multiple points of contact on a display of a device, each of the multiple points of contact having respective coordinates at which the display detects contact;
    identifying some of the plurality of input events as first input events, the first input events including a selected input event;
    identifying some of the plurality of input events as second input events, the second input events occurring at times prior to a time of the selected input event;
    determining a first velocity of the stroke input based on the first input events;
    determining a second velocity of the stroke input based on the second input events;
    selecting a first cutoff frequency of a first filter based on the first velocity;
    selecting a second cutoff frequency of a second filter based on the second velocity;
    removing first high frequency components of the plurality of input events using the first filter to generate first filtered inputs, the first high frequency components having frequencies above the first cutoff frequency;
    removing second high frequency components of the plurality of input events using the second filter to generate second filtered inputs, the second high frequency components having frequencies above the second cutoff frequency;
    generating a first output using the first filtered inputs;
    displaying the first output on the device;
    generating a second output using the second filtered inputs; and
    displaying the second output on the device after displaying the first output.

6. The computer-implemented method of claim 5, wherein:

identifying some of the plurality of input events as the first input events further comprises identifying the selected input event as a most recent input event of the plurality of input events, and the first input events are a determined number of input events of the plurality of input events prior to and including the most recent input event.

7. The computer-implemented method of claim 5, wherein:

identifying some of the plurality of input events as the second input events further comprises identifying a center input event of the plurality of input events, and the second input events are a determined number of input events of the plurality of input events centered on the center input event.

8. The computer-implemented method of claim 5, wherein:

identifying some of the plurality of input events as the first input events further comprises:
identifying the selected input event as a most recent input event of the plurality of input events, and
identifying the first input events, the first input events being a first number of input events prior to and including the most recent input event; and identifying some of the plurality of input events as the second input events further comprises:
identifying a center input event of the plurality of input events, the center input event previous to the most recent input event, and
identifying the second input events, the second input events being a second number of input events centered on the center input event.

9. The computer-implemented method of claim 5, wherein:

a velocity of the stroke input includes a first component along a first axis of the display and a second component along a second axis of the display, and the first velocity is based only on the first component.

10. The computer-implemented method of claim 5, further comprising:

selecting a new first cutoff frequency after expiration of a time interval.

11. The computer-implemented method of claim 5, further comprising:

selecting a new first cutoff frequency based on a change in the first cutoff velocity.

12. The computer-implemented method of claim 5, further comprising:

changing a value of the first cutoff frequency from a first frequency value to a second frequency value by transitioning to at least one intermediate frequency value between the first frequency value and the second frequency value.

13. The computer-implemented method of claim 5, wherein the second cutoff frequency is lower than the first cutoff frequency.

14. The computer-implemented method of claim 5, further comprising:

determining that the stroke input is complete.

15. The computer-implemented method of claim 5, further comprising:

determining a third velocity of the stroke input between a first input event of the first input events and a second input event of the first input events;

determining a fourth velocity of the stroke input between the second input event of the first input events and a third input event of the first input events;

determining the first velocity based on the third velocity and the fourth velocity;

determining a fifth velocity of the stroke input between a first input event of the second input events and a second input event of the second input events;

determining a sixth velocity of the stroke input between the second input event of the second input events and a third input event of the second input events; and determining the second velocity based on the fifth velocity and the sixth velocity.

16. A device, comprising:

a touchscreen;

at least one processor;

memory including instructions operable to be executed by the at least one processor to perform a set of actions to cause the device to:

determine a plurality of input events corresponding to a stroke input, the plurality of input events corresponding to multiple points of contact on the touchscreen, each of the multiple points of contact having respective coordinates at which the touchscreen detects contact;

identify some of the plurality of input events as first input events, the first input events including a selected input event;

identify some of the plurality of input events as second input events, the second input events occurring at times prior to a time of the selected input event;

determine a first velocity of the stroke input based on the first input events;

determine a second velocity of the stroke input based on the second input events;

select a first cutoff frequency of a first filter based on the first velocity;

remove first high frequency components of the plurality of input events using the first filter to generate first filtered inputs, the first high frequency components having frequencies above the first cutoff frequency;

remove second high frequency components of the plurality of input events using the second filter to generate second filtered inputs, the second high frequency components having frequencies above the second cutoff frequency;

generate a first output using the first filtered inputs;

display the first output on the device;

generate a second output using the second filtered inputs; and display the second output on the device after displaying the first output.

17. The device of claim 16, wherein the memory further comprises instructions that, when executed by the at least one processor, further cause the device to:

identify the selected input event as a most recent input event of the plurality of input events, wherein the first input events are a determined number of input events of the plurality of input events prior to and including the most recent input event.

18. The device of claim 16, wherein the memory further comprises instructions that, when executed by the at least one processor, further cause the device to:

identify a center input event of the plurality of input events, wherein the first input events are a determined number of input events of the plurality of input events centered on the center input event.

19. The device of claim 16, wherein the memory further comprises instructions that, when executed by the at least one processor, further cause the device to:
- identify the selected input event as a most recent input event of the plurality of input events;
- identify the first input events, the first input events being a first number of input events prior to and including the most recent input event;
- identify a center input event of the plurality of input events, the center input event previous to the most recent input event; and
- identify the second input events, the second input events being a second number of input events centered on the center input event.

20. The device of claim 16, wherein:
a velocity of the stroke input includes a first component along a first axis of the touchscreen and a second component along a second axis of the touchscreen, and the first velocity is based only on the first component.

* * * * *